United States Patent
Wong et al.

(10) Patent No.: US 9,602,541 B2
(45) Date of Patent: Mar. 21, 2017

(54) GRANTING PERMISSION TO ACT ON BEHALF OF A USER IN A SOCIAL NETWORKING SYSTEM

(71) Applicant: Facebook, Inc., Menlo Park, CA (US)

(72) Inventors: Mark Kar Hong Wong, Redwood City, CA (US); Benjamin K. Billings, San Carlos, CA (US); Joshua D. Williams, San Francisco, CA (US); Cameron Chuk Hing Wu, San Francisco, CA (US); Christopher Triolo, Commack, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/198,810

(22) Filed: Mar. 6, 2014

(65) Prior Publication Data
US 2015/0256557 A1    Sep. 10, 2015

(51) Int. Cl.
*H04L 29/06* (2006.01)
*H04L 29/08* (2006.01)
*G06Q 50/00* (2012.01)

(52) U.S. Cl.
CPC ............. *H04L 63/20* (2013.01); *G06Q 50/01* (2013.01); *H04L 63/08* (2013.01); *H04L 67/20* (2013.01); *H04L 67/306* (2013.01)

(58) Field of Classification Search
CPC .................... H04L 63/20; H04L 67/306
See application file for complete search history.

(56) References Cited

U.S. PATENT DOCUMENTS

| | | | |
|---|---|---|---|
| 6,957,199 B1 * | 10/2005 | Fisher | G06Q 20/02 705/50 |
| 2006/0089932 A1 * | 4/2006 | Buehler | H04L 63/105 |
| 2007/0027754 A1 * | 2/2007 | Collins | G06Q 10/0631 705/14.48 |
| 2012/0054095 A1 * | 3/2012 | Lesandro | G06Q 20/10 705/39 |
| 2012/0166532 A1 | 6/2012 | Juan et al. | |
| 2013/0268357 A1 * | 10/2013 | Heath | H04L 63/00 705/14.53 |
| 2014/0012908 A1 * | 1/2014 | Manry et al. | 709/204 |
| 2014/0156360 A1 | 6/2014 | Shalita et al. | |
| 2014/0156566 A1 | 6/2014 | Kabiljo et al. | |
| 2014/0156744 A1 | 6/2014 | Hua et al. | |

* cited by examiner

*Primary Examiner* — Saleh Najjar
*Assistant Examiner* — Louis Teng
(74) *Attorney, Agent, or Firm* — Fenwick & West LLP

(57) ABSTRACT

A social networking system allows entities to delegate actions performed on behalf of the entity to social networking system users by assigning one or more roles to social networking system users. Roles may be assigned based on information associated with the entity by the social networking system. Different roles are associated with sets of permissions specifying actions a user associated with a role is authorized to perform on behalf of the entity via the social networking system. Certain permissions of a role associated with the user may be associated with additional users by the user. A persona including a subset of information associated with a user by the social networking system may be created for a user assigned a role, allowing the user to limit information accessible to additional users connected to the persona.

15 Claims, 2 Drawing Sheets

GRANTING PERMISSION TO ACT ON BEHALF OF A USER IN A SOCIAL NETWORKING SYSTEM

BACKGROUND

This disclosure relates generally to social networking systems, and more specifically to granting permission to act on behalf of a user in a social networking system.

A social networking system allows its users to connect to and communicate with other social networking system users. Users may create profiles on a social networking system that are tied to their identities and include information about the users, such as interests and demographic information. The users may be individuals or entities such as corporations or charities. Social networking systems maintain a significant amount of user-specific information and information describing relationships between users on the social networking system. To allow users to regulate access to their information by other users, many social networking systems allow their users to grant or deny access to user-specific information based on relationships between the users.

Conventionally, social networking systems typically allow businesses and other entities to maintain the same presence on social networking systems as individual users by allowing administrators authorized to act on behalf of entities to create and maintain information associated with the entities. For example, administrators may create advertisements, create posts, respond to comments, and perform other activities on the social networking system on behalf of an entity. However, conventional social networking systems do not allow entities customize the roles of administrators based on the relationships between the administrators and entities or on the experience levels of various administrators.

Further, conventional social networking systems also do not allow an entity to extend permission to act on its behalf to users associated with a different entity that has a relationship with the entity. For example, a conventional social networking system does not allow a retailer to grant an employee of an advertising agency permission to access information about funding sources of the retailer's advertising based on the retailer's relationship to the advertising agency via the social networking system. Additionally, while a conventional social networking system allow a user to specify privacy settings limiting additional users' ability to access information maintained by social networking system and associated with the user, conventional social networking systems do not allow the user to maintain separate sets of information associated with the user and regulate access of additional users to the sets of information based on a type of connection between the user and an additional user.

SUMMARY

To allow a business or other entity to delegate or regulate actions that social networking system users may perform on behalf of the business or entity, a social networking system allows an entity to associate one or more roles with a user of the social networking system. A role is associated with one or more actions that a user associated with the role is authorized to perform on behalf of the entity. Various permissions are associated with a role to allow a user associated with the role to perform one or more of the actions associated with the role. Additionally, a role associated with a user may allow a user to assign a subset of the permissions associated with the role to one or more additional users, allowing an additional user to perform actions associated with the rule limited by the subset of permissions assigned to the additional user. For example, when a role is assigned to a business, the business may assign permissions associated with the role to various employees of the business. In one embodiment, a user associated with a role is limited to assigning permissions to other users having specified types of connections to the user. For example, a business associated with a role is limited to assigning permissions to users that are employees of the business and is not allowed to assign permissions to users having other types of connections to the business.

An entity may assign a role to a user through various methods. For example, an entity associates a role with a user in response to the entity receiving a request for the role from the user. Alternatively, an entity may assign a role to a user on its own initiative. An entity may associate roles with various types of users, with certain roles associated with certain types of users. For example, an entity may associate a role with a business, an individual, an organization, a group, a charity, or any other type of user of the social networking system. In some embodiments, when an entity associates a role with a user, the user associates a reciprocal role with the entity; for example, if an entity associates a role of "advertiser" with a user, the user associates a role of "client" with the entity.

In one embodiment, to identify roles associated with a user by an entity, the social networking system maintains a connection between the user and the entity that identifies one or more roles associated with the user by the entity, allowing the user to perform actions on the social networking system on behalf of the entity that are authorized by permissions associated with the role. For example, a business associates a user with a role of advertiser in response to receiving a request from the user to be assigned the role, and the social networking system maintains a connection between the user and entity identifying the role and one or more permissions associated with the role. When the user attempts to perform an action via the social networking system on behalf of the entity, the permissions associated with the connection are identified to determine whether the user is authorized to perform the action.

An entity may be associated with various types of assets corresponding to different types of information or content maintained by the social networking system. Different types of assets may be associated with different roles, allowing the entity to assign roles to a user based on types of assets associated with the entity. Example types of assets include pages, advertising accounts, funding sources, groups of custom audiences, etc. Hence, an entity may assign roles to various users on a per-asset basis. For example, roles associated with a page asset include content creator, administrator, or moderator. As another example, roles associated with an advertising account asset include advertisement creator and advertisement administrator.

Additionally, the social networking system maintains various types of information about a user in a user profile associated with the user. For example, a user profile includes biographic and demographic information, interests, connections to other users, and may include additional information such as images, videos, notes, appointments, etc. To allow a user to more effectively perform actions associated with a role, the social networking system may generate a persona associated with the user. The persona hides a subset of information included in the user profile associated with the user from users connected to the persona. Hence, a persona is associated with a user profile and includes information provided or specified by the user as accessible by additional users connected to the profile. Accordingly, the persona may limit access to information associated with the user to information for use in a role associated with the user. For example, a user's user name and contact e-mail address associated with a persona may differ from the user's user name and contact e-mail address used for connections with the user's user profile maintained by the social networking system. Multiple personas may be associated with a single user profile, allowing the user to customize the information associated with the user that is accessible to different additional users.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
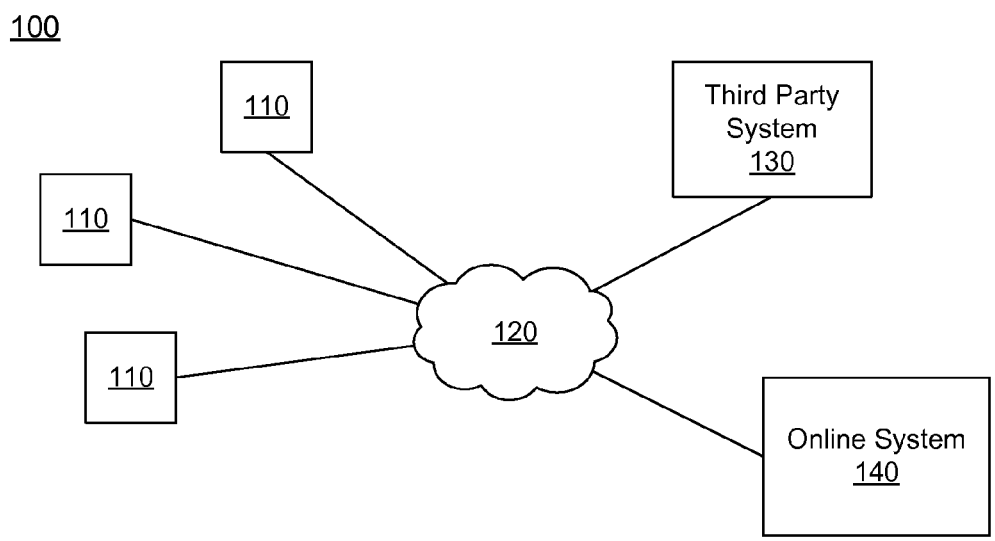
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
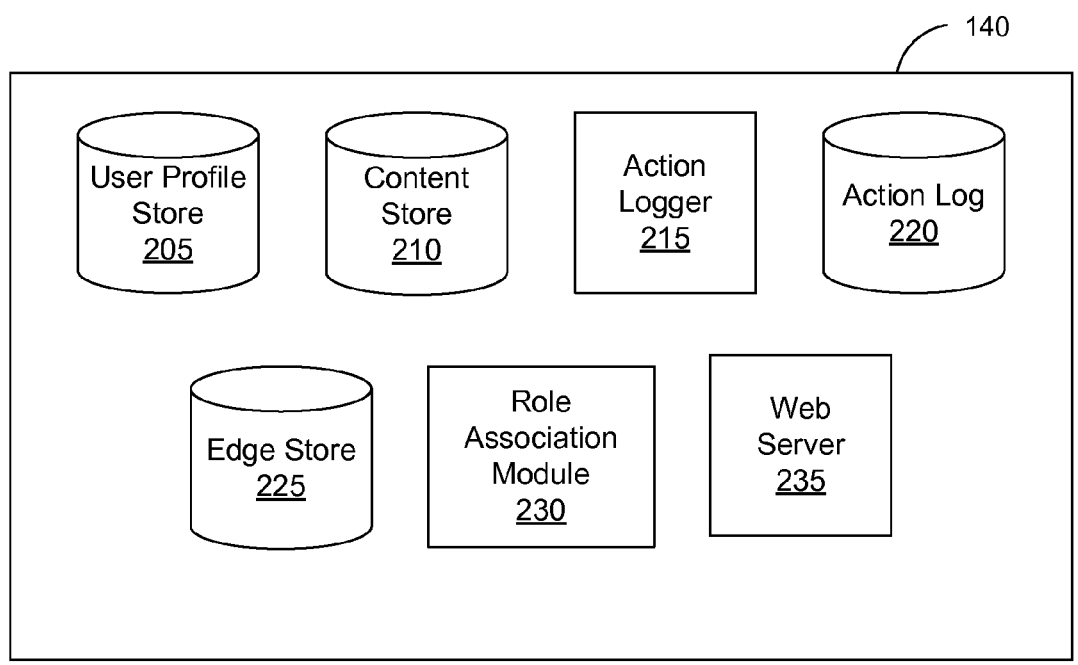
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a role association module 230, and a web server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

Additionally, the user profile store 205 stores one or more personas associated with a user profile. A persona includes a subset of information associated with a user profile maintained by the social networking system 140, so additional users authorized to access the persona have access to the subset of information in the persona rather than the information in the user profile. As further described below in conjunction with FIG. 3, a persona allows certain information associated with a user profile associated with a user to be hidden from certain social networking system users to which the user is connected.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions. In some embodiment, information identifying one or more roles or permissions associated with roles is stored in association with an edge. For example, information identifying actions a user is authorized to perform on behalf of an additional user and identifying the additional user is associated with an edge.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The role association module 230 associates roles with users. Additionally, the role association module 230 associates one or more permissions comprising a role with a user. Different roles may be associated with different types of assets, allowing a user to associate other users with roles based on a type of asset associated with the user. Similarly, different assets may be associated with more than one type of role, which may be associated with more than one type of permission. Types of assets correspond to different types of information or content maintained by the social networking system 140 in the content store 210. Example types of assets include: pages, groups of users, advertising accounts, applications, events, funding sources, and any other suitable types of information or content maintained by the social networking system 140. A funding source may be associated with a maximum spending limit, which may be based on a role assigned to a user granted permission to authorize payments from the funding source; hence, different users may have different maximum spending limits for a funding source based on roles associated with various users. For example, a funding source is associated with a maximum spending limit of $10,000 for a user assigned an advertiser role and is associated with a maximum spending limit of $500 for a user assigned a content creator role. Example types of roles include content creator, administrator, moderator, and advertiser.

Different types of roles are associated with different sets of permissions that enable a user assigned a role and connected to an entity to perform one or more actions on behalf of the entity to perform one or more actions associated with the role based on the permissions associated with the role via the social networking system 140. Examples of types of permissions include: permission to access advertising insights, permission to authorize payments from a funding source, permission to create content, permission to contact users and third-parties on behalf of an additional user, and permission to create an advertisement. In some embodiments, a user assigning a role (e.g., an entity) may customize permissions associated with a role by adding or removing permissions; similarly, a user may add or remove roles associated with types of assets. For example, an organization assigning a role of content creator to a user may specify that the user receive authorization from the organization prior to posting content on the social networking system 140 by removing a permission to publish content from a set of permissions associated with a role of content creator.

The web server 235 links the social networking system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Granting Permissions to Act on Behalf of an Entity Through Assignment of a Role

Figure 3:
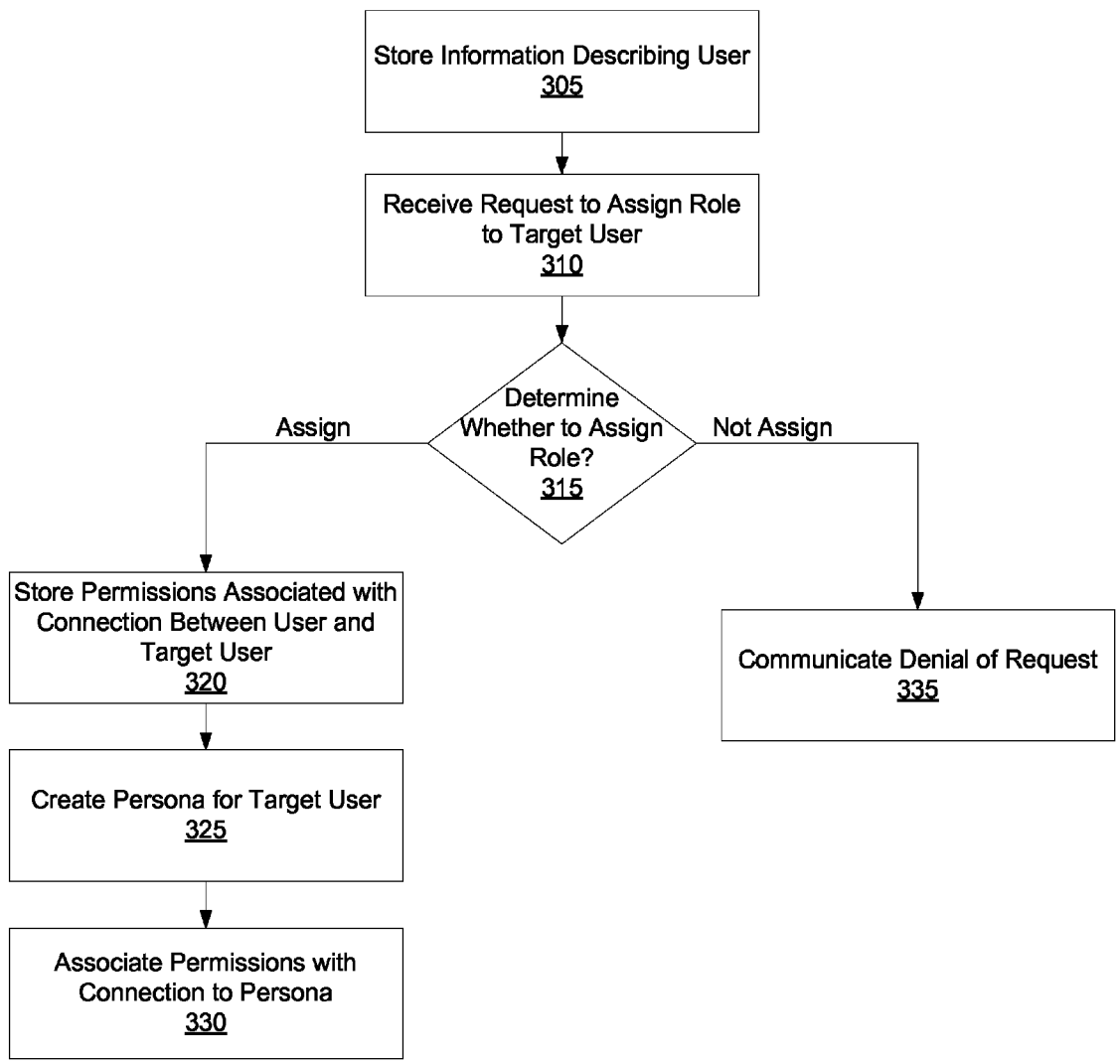
FIG. 3 is a flow chart of a method for granting permissions to a user to act on behalf of an entity, in accordance with an embodiment.

FIG. 3 is a flow chart of one embodiment of a method for granting permissions to a user of a social networking system 140 to act on behalf of an entity. In various embodiments, the method may include different and/or additional steps than those described in conjunction with FIG. 3. The social networking system 140 stores 305 information describing a user. For example, if the user is an organization, the stored information identifies additional users connected to the organization and describes relationships between the additional users and the organization (e.g., the additional users may be employees, clients, independent contractors, etc.). Additionally, information describing the user also identifies one or more assets associated with the user. Assets are various items of information or content maintained by the social networking system 140 and associated with the user (e.g., pages, funding sources, groups of custom audiences, advertising accounts, applications, groups, events, etc.).

Stored information associated with the user may also associate different roles with different types of assets or with individual assets. Example types of roles include content creator, administrator, moderator, and advertiser. For example, roles associated with a page asset include content creator, administrator, and moderator, while an example role associated with an advertising account asset is an advertiser. A role is associated with a set of permissions allowing a user associated with the role to perform one or more actions corresponding to the role; hence, permissions allow a user to perform one or more actions associated with an asset on behalf of another user on the social networking system 140. Associating different roles with different types of assets allows a user to regulate interactions of other users with specific assets or asset types. For example, if multiple types of assets are associated with a business, the business may grant all or a subset of permissions associated with a role to a user as a set of permissions rather than determining what types of individual permissions may be granted to the user.

The social networking system 140 receives 310 a request to assign a role to a target user. In various embodiments, the request is received 310 from a user capable of granting one or more permissions associated with a role (e.g., an organization), a target user to be associated with a role, or an additional user that is requesting association of a role with an additional user (e.g., an employee of an organization requesting association of role with another employee). For example, if the user is an organization, the organization may request to assign a role to a user connected to the organization, such as an employee, an independent contractor, a vendor, etc. As an additional example, a user connected to an organization may request to be assigned a role by the organization or request that the organization assign a role to an additional user. The request may include information identifying a type of asset (e.g., page, funding source, group of users, advertising account, etc.) or identifying one or more permissions associated with the requested role (e.g., permissions to access advertising insights, permissions to authorize payments from a funding source, permissions to create content on the social networking system 140, permissions to contact users and third parties on behalf of an additional user or entity, permissions to create an advertisement, etc.).

In an embodiment, the role identified by the request or permissions associated with the role identified by the request may depend on one or more assets identified by the request. For example, a role for creating content associated with a request depends on whether an asset identified in the request is a page or an advertising account, as different roles may be associated with the page and the advertising account, such as page content creator or advertisement creator, respectively. As an additional example, if a business requests assignment of a role to create an advertisement for the business to an organization, the request identifies assets of an advertising account and a funding source. Based on these assets, the social networking system 140 determines that the role assigned to the organization is advertising agency and the permissions associated with the role are permissions to create an advertisement, permissions to access advertising insights, and permissions to authorize payments from the funding source. In some embodiments, a user assigning a role to a target user may add, remove, or otherwise modify one or more roles associated with types of assets or may add, remove, or otherwise modify permissions associated with roles. In the preceding example, the business assigning the role of advertising agency to the organization may specify that the organization is required to receive authorization from the business for payments from the funding source by removing the permission to authorize payments from the funding source from the set of permissions associated with the role.

In one embodiment, one or more permissions associated with a role may be identified as delegable, allowing a user to delegate those permissions to one or more additional users. Thus, a user identifies delegable permissions associated with a role in the request, the target user may delegate a subset of those permissions to various additional users when the target user is assigned the role, allowing portions of an action associated with the role to be performed by the additional users to which the permissions are delegated. For example, if a business assigning a role of advertising agency to an organization specifies that one or more permissions associated with the role are delegable, the organization may hire a contractor to create an advertisement and assign permission to create an advertisement to the contractor while retaining permissions associated with the role.

The social networking system 140 determines 315 whether to associate the role with the target user identified by the request. Association of a role with a target user may be based at least in part on a connection between the target user and the user. For example, the social networking system determines whether a connection between the target user and the user exists and a type of connection between the target user and the user to determine 315 whether to associate the role with the target user. For example, a content creator role requested to be associated with a target user by a business is associated with the target user if the user is connected to the business via the social networking system 140 and information stored by the social networking system 140 identifies the target user as an employee of the business. As an additional example, a requested role of administrator of a business is not associated with a target user if the social networking system 140 does not include a connection between the business and the target user or if a connection between the business and the target user is maintained by the social networking system 140, but the connection does not identify the target user as having administrative authority to act on behalf of the business (e.g., the user is a former employee or is an intern not currently working for the business).

Alternatively, the request may be communicated to the user, allowing the user to determine 315 whether to associate the role with the target user. Based on the user's response to the request, the social networking system 140 determines 315 whether to associate the role with the target user. The request may be communicated to the user through e-mail, instant message, text message or any other suitable form of communication. In one embodiment, the request is communicated to the user after determining that the user has a specified type of connection with the target user; if a connection between the user and the target user is not a specified type, the request is not communicated to the user, limiting association of roles to target users having specific types of connections to the user.

If the social networking system 140 determines 315 to associate the role with the target user, the social networking system 140 stores 320 one or more permissions associated with the connection between the user and the target user. Stored permissions are associated with the role and allow the target user to perform one or more actions associated with the role on behalf of the user via the social networking system 140. Information about the role and its associated permissions may be stored 325 in an edge between nodes representing the user and the target user in a graph maintained by the social networking system 140. This information may be subsequently retrieved by the social networking system 140 when the target user attempts to perform an action on behalf of the user to determine whether the target user is authorized to perform the attempted action on behalf of the user. For example, if a user is associated with a role of advertiser by a business, and the user attempts to access advertising insights for the business, the social networking system 140 retrieves information associated with a connection between the user and the business to determine whether permissions associated with the user by the business authorize the user to access the advertising insights or prevent the user from accessing the advertising insights.

In one embodiment, a persona is created 325 for the target user, allowing permissions associated with the role to be associated 330 with a connection between the user and the target user maintained by the social networking system 140. A persona includes a subset of information associated with a user profile associated with the target user maintained by the social networking system 140, limiting information associated with the target user that is accessible to additional users connected to the persona. For example, a subset of information in the target user's user profile or a subset of the user's connections to other users are associated with the persona, limiting access of other users connected to the persona to the subset of information or the subset of connections associated with the persona rather than the user's complete user profile. The target user may create 325 the persona or the social networking system 140 may create 325 the persona and the target user may customize the created persona by specifying information included in the persona and users connected to the target user to which the persona is presented in lieu of the target user's user profile. For example, rather than allowing businesses to which a user is connected to view all the user's complete user profile, the social networking system 140 allows the user to create 325 a persona limiting information associated with the user accessible to businesses to information that is relevant for business purposes (e.g., a business logo rather than a profile picture, a business e-mail address and phone number rather than a personal e-mail address and phone number, the user's business connections rather than social connections, etc.).

A persona is associated with a user's social networking system user profile and stored in the user profile store 205. For example, a user accesses information associated with a persona associated with their user profile when accessing the social networking system 140. Multiple personas may be associated with a single user profile. For example, a user who is a student and a business owner may create 325 a persona associated with a set of information relevant to the user's business connections or roles and another persona associated with a set of information relevant to the user's academic connections or roles.

The target user may further assign roles or permissions associated with one or more of its associated roles to additional users. For example, if the target user is a business entity (e.g., an advertising agency), the target user may further assign roles to additional users connected to the target user (e.g., employees of the target user) and associate a subset of the permissions associated with one or more roles associated with the target user to additional users to additional users. In one embodiment, the target user is limited to assigning roles and their associated permissions to additional users having a particular type of connection to the target user (e.g., employees) and additional users having different types of connections to the target user (e.g., independent contractors). If the social networking system 140 determines that a connection between the user and an additional user is not sufficient to authorize the assignment of a subset of roles or permissions originally assigned or granted to the user, the subset of roles or permissions is not associated with a connection between the user and the additional user.

The social networking system 140 communicates 335 denial of the request to assign the role to the target user if it determines that the role should to not be associated with the target user. For example, if the connection between the target user and the user is not a specific type necessary for the role to be associated with the target user, an indication that the role has not been assigned to the target user is communicated 335 to the user from which the request was received. The denial may be communicated 335 via e-mail, instant message, text message or any other suitable form of communication. Denial of the request to assign the role may also be communicated 335 if the user declines to associate the role with the target user. For example, if a junior software engineer requests to be assigned a role of content creator for a business, the business will deny the request though the requesting user is an employee of the business if the business reserves the role of content creator for senior software engineers. In this example, based on the denial of the request to assign the role by the business, the social networking system 140 communicates 335 denial of the request to the requesting user.

SUMMARY

The foregoing description of the embodiments have been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:

storing, in an online system, data describing an organization, wherein the data describing the organization identifies one or more assets maintained by the online system and associated with the organization, each asset associated with a type of asset that is selected from a group of types of assets consisting of: a page, an advertising account, a source of funding, a list identifying one or more users of the online system, an application, and an event, wherein each type of asset is associated, respectively, with one or more roles that identify one or more actions a user is authorized to perform on behalf of the organization;

receiving, by the online system, a request from a first client device associated with the organization, the request to associate a role with the user of the online system, the role identifying an action the user is authorized to perform on behalf of the organization for a first asset of the one or more assets;

determining, by the online system, a type of the first asset;

determining, by the online system, whether to associate the role with the user according to a connection between the user and the organization maintained by the online system and the determined type of the first asset;

responsive to determining to associate the role with the user:

determining, by the online system, one or more permissions enabling the user to perform the action identified by the role with the connection between the user and the organization, the role determined to be associated according to the determined type of the first asset, determining the one or more permissions comprises:

generating a first persona associated with the user, the first persona including a first subset of information associated with the user by the online system, generating a second persona associated with the user, the second persona including a second subset of information associated with the user by the online system, establishing a connection between the organization and the first persona, establishing a connection between another organization and the second persona, providing the first client device associated with the organization access to the first subset of the information associated with the user included in the first persona, and preventing the first client device associated with the organization access to the second subset of the information associated with the user included in the second persona, and storing information describing the one or more permissions enabling the user to perform the action identified by the role in association with the connection between the organization and the first persona;

receiving, from a second client device associated with the user, a user request of the user to perform the action identified by the role associated with the determined type of the first asset; and authorizing the second client device associated with the user to perform the action according to the information describing the one or more permissions.

2. The method of claim 1, further comprising:
storing the first persona in the online system.

3. The method of claim 1, wherein the first subset of information associated with the user by the online system is selected from a group consisting of: information in a user profile associated with the user by the online system, connections between the user and one or more additional users of the online system, actions associated with the user by the online system, and any combination thereof.

4. The method of claim 1, wherein the request identifies an asset and the role is associated with the asset.

5. The method of claim 1, wherein the role is selected from a group consisting of: an advertiser, a moderator, a content creator, an administrator, and any combination thereof.

6. The method of claim 1, wherein the one or more permissions are selected from a group consisting of: viewing information associated with the organization, creating content associated with the organization, removing content associated with the organization, authorizing a payment from a funding source associated with the organization, accessing information associated with the organization, accessing resources associated with the organization, and any combination thereof.

7. The method of claim 1, further comprising:
responsive to determining not to associate the role with the user, communicating a denial of the request to the first client device associated with the organization.

8. The method of claim 1, wherein the user is an additional organization.

9. A method comprising:

storing, in an online system, data describing an organization, wherein the data describing the organization identifies one or more assets maintained by the online system and associated with the organization, each asset associated with a type of asset that is selected from a group of types of assets consisting of: a page, an advertising account, a source of funding, a list identifying one or more users of the online system, an application, and an event, wherein each type of asset is associated, respectively, with one or more roles that identify one or more actions a user is authorized to perform on behalf of the organization;

receiving, by the online system, a request from a first client device associated with the user, the request to associate a role with the user of the online system, the role identifying an action the user is authorized to perform on behalf of the organization for a first asset of the one or more assets;

determining, by the online system, a type of the first asset;

determining, by the online system, whether to associate the role with the user according to a connection between the user and the organization maintained by the online system and the determined type of the first asset;

responsive to determining to associate the role with the user:

determining, by the online system, one or more permissions enabling the user to perform the action identified by the role with the connection between the user and the organization, the role determined to be associated according to the determined type of the first asset, determining the one or more permissions comprises:

generating a first persona associated with the user, the first persona including a first subset of information associated with the user by the online system, generating a second persona associated with the user, the second persona including a second subset of information associated with the user by the online system, establishing a connection between the organization and the first persona, establishing a connection between another organization and the second persona, providing a second client device associated with the organization access to the first subset of the information associated with the user included in the first persona, and preventing the second client device associated with the organization access to the second subset of the information associated with the user included in the second persona, and storing information describing the one or more permissions enabling the user to perform the action identified by the role in association with the connection between the organization and the first persona;

receiving, from the first client device associated with the user, a user request of the user to perform the action identified by the role associated with the type of the first asset; and authorizing the first client device associated with the user to perform the action according to the information describing the one or more permissions.

10. The method of claim 9, further comprising: storing the first persona in the online system.

11. The method of claim 9, wherein the first subset of information associated with the user by the online system is selected from a group consisting of: information in a user profile associated with the user by the online system, connections between the user and one or more additional users of the online system, actions associated with the user by the online system, and any combination thereof.

12. The method of claim 9, wherein the request identifies an asset and the role is associated with the asset.

13. The method of claim 9, wherein the role is selected from a group consisting of: an advertiser, a moderator, a content creator, an administrator, and any combination thereof.

14. The method of claim 9, wherein the one or more permissions are selected from a group consisting of: viewing information associated with the organization, creating content associated with the organization, removing content associated with the organization, authorizing a payment from a funding source associated with the organization, accessing information associated with the organization, accessing resources associated with the organization, and any combination thereof.

15. A non-transitory computer-readable storage medium having instructions encoded thereon that, when executed by a processor of an online system, cause the processor to:

store, in the online system, data describing a user, the data identifying one or more assets associated with the user, each asset associated with a type, wherein the data describing the user identifies one or more assets maintained by the online system and associated with the user, each asset associated with a type of asset that is selected from a group of types of assets consisting of: a page, an advertising account, a source of funding, a list identifying one or more users of the online system, an application, and an event, wherein each type of asset is associated, respectively, with one or more roles that identify one or more actions a target user is authorized to perform on behalf of the user;

receive, by the online system, a request from a first client device associated with a requesting user, the request to associate a role with the target user of the online system, the role associated with an asset and identifying an action the target user is authorized to perform on behalf of the user for a first asset of the one or more assets;

determine, by the online system, a type of the first asset;

determine, by the online system, whether to associate the role with the target user according to a connection between the target user and the user maintained by the online system and the determined type of the first asset;

responsive to determining to associate the role with the target user:

determine, by the online system, one or more permissions in association with the connection between the target user and the user, the one or more permissions associated with the determined type of the first asset and enabling the target user to perform the action identified by the role, the role determined to be associated according to the determined type of the first asset, determining the one or more permissions comprises:

generating, by the online system, a first persona associated with the target user, the first persona including a first subset of information associated with the target user by the online system, generating, by the online system, a second persona associated with the target user, the second persona including a second subset of information associated with the target user by the online system, establishing, by the online system, a connection between the user and the first persona, establishing, by the online system, a connection between another user and the second persona, providing, by the online system, a second client device associated with the user access to the first subset of the information associated with the target user included in the first persona, and preventing, by the online system, the second client device associated with the user access to the second subset of the information associated with the target user included in the second persona, and store, by the online system, information describing the one or more permissions enabling the target user to perform the action identified by the role in association with the connection between the user and the first persona;

receive, from a third client device associated with the target user, a user request of the target user to perform the action identified by the role associated with the type of the first asset; and authorize the third client device associated with the target user to perform the action according to the information describing the one or more permissions.

* * * * *